(12) United States Patent
Yiu

(10) Patent No.: US 10,986,548 B2
(45) Date of Patent: Apr. 20, 2021

(54) ENHANCED CONDITIONAL HANDOVER

(71) Applicant: Apple Inc., Cupertino, CA (US)

(72) Inventor: Candy Yiu, Portland, OR (US)

(73) Assignee: Apple Inc., Cupertino, CA (US)

( * ) Notice: Subject to any disclaimer, the term of this patent is extended or adjusted under 35 U.S.C. 154(b) by 25 days.

(21) Appl. No.: 16/488,175

(22) PCT Filed: Mar. 22, 2018

(86) PCT No.: PCT/US2018/023900
§ 371 (c)(1),
(2) Date: Aug. 22, 2019

(87) PCT Pub. No.: WO2018/175819
PCT Pub. Date: Sep. 27, 2018

(65) Prior Publication Data
US 2020/0022042 A1 Jan. 16, 2020

Related U.S. Application Data

(60) Provisional application No. 62/475,466, filed on Mar. 23, 2017, provisional application No. 62/476,026, filed on Mar. 24, 2017.

(51) Int. Cl.
*H04W 36/00* (2009.01)
*H04W 76/11* (2018.01)
(Continued)

(52) U.S. Cl.
CPC .. *H04W 36/00837* (2018.08); *H04W 36/0058* (2018.08); *H04W 36/08* (2013.01);
(Continued)

(58) Field of Classification Search
USPC .......................................................... 370/331
See application file for complete search history.

(56) References Cited

U.S. PATENT DOCUMENTS 8,437,758 B2 * 5/2013 Zuniga ................ H04W 36/005
455/437
2010/0124172 A1 5/2010 Tenny et al.
(Continued)

FOREIGN PATENT DOCUMENTS

WO 2018/175819 A1 9/2018

OTHER PUBLICATIONS

International Search Report and Written Opinion received for International Application No. PCT/US2018/023900, dated Aug. 1, 2018, 20 pages.

*Primary Examiner* — Robert J Lopata
(74) *Attorney, Agent, or Firm* — Fay Kaplun & Marcin, LLP

(57) ABSTRACT

Briefly, in accordance with one or more embodiments, an apparatus of a user equipment (UE) comprises one or more baseband processors to decode a conditional handover command from a serving cell for the UE to connect with a target cell, and to evaluate a condition before executing the handover command, wherein a first time to trigger (TTT) is started in the event the condition is true, and wherein a second TTT is started in the event the condition is true at an expiration of the first TTT, and wherein the one or more baseband processors are to execute the conditional handover command when the condition is true after an expiration of the second TTT, and a memory to store the first TTT and the second TTT.

20 Claims, 5 Drawing Sheets

(51) Int. Cl.
*H04W 36/08* (2009.01)
*H04W 36/32* (2009.01)
*H04W 74/08* (2009.01)

(52) U.S. Cl.
CPC ....... *H04W 36/32* (2013.01); *H04W 74/0833* (2013.01); *H04W 76/11* (2018.02)

(56) References Cited

U.S. PATENT DOCUMENTS

| | | | |
|---|---|---|---|
| 2013/0273916 A1* | 10/2013 | Gupta | H04W 36/0094 |
| | | | 455/436 |
| 2013/0273919 A1* | 10/2013 | Sashihara | H04W 36/00837 |
| | | | 455/436 |
| 2014/0133465 A1 | 5/2014 | Johansson et al. | |
| 2015/0215831 A1* | 7/2015 | Jung | H04W 36/0085 |
| | | | 370/332 |
| 2015/0271717 A1* | 9/2015 | Moon | H04W 76/18 |
| | | | 455/437 |
| 2016/0285679 A1* | 9/2016 | Dudda | H04W 24/10 |
| 2016/0302119 A1* | 10/2016 | Chen | H04W 76/14 |
| 2016/0381610 A1* | 12/2016 | Pu | H04W 36/0094 |
| | | | 455/436 |
| 2018/0206171 A1* | 7/2018 | Basu Mallick | H04W 36/0072 |
| 2018/0249385 A1* | 8/2018 | Wong | H04W 36/0055 |
| 2019/0059029 A1* | 2/2019 | Lunden | H04W 36/30 |
| 2019/0327641 A1* | 10/2019 | Mok | H04W 4/40 |
| 2020/0288370 A1* | 9/2020 | Mok | H04W 36/32 |

\* cited by examiner

ENHANCED CONDITIONAL HANDOVER

CROSS-REFERENCE TO RELATED APPLICATIONS

The present application claims the benefit of U.S. Provisional Application No. 62/475,466 (P117149Z) filed Mar. 23, 2017 and the benefit of U.S. Provisional Application No. 62/476,026 (P117211Z) filed Mar. 24, 2017. Said Application No. 62/475,466 and said Application No. 62/476,026 are hereby incorporated herein by reference in their entireties.

BACKGROUND

When a user equipment (UE) device is connected with a serving cell, the signal received from the serving cell may degrade for example due to mobility of the UE. As a result, the received signal from one or more neighboring cells may be stronger than the received signal from the serving cell. The UE may switch to a neighboring cell with a stronger received signal to be the new serving cell in a process referred to as a handover in a context referred to as mobility management. During a mobility management context, the UE may obtain one or more measurement reports on one or more neighbor cells to identify a suitable target cell to which to perform the handover. A determination may be made whether or not to switch to a new cell based on whether or not the received signal strength of reference signals received from a neighbor cell exceeds a signal strength threshold. If a lower threshold is set, then the UE will switch to a new cell sooner and more frequently, and if a higher threshold is set, then the UE will switch to a new cell later and less frequently. Normally, the handover command is executed immediately upon receiving a measurement report that indicates a target cell has exceeded the threshold. To help control the reliability of the handover process, even if a measurement report indicates a handover should occur, execution of the handover command may have an additional condition to be met before the handover is actually made.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
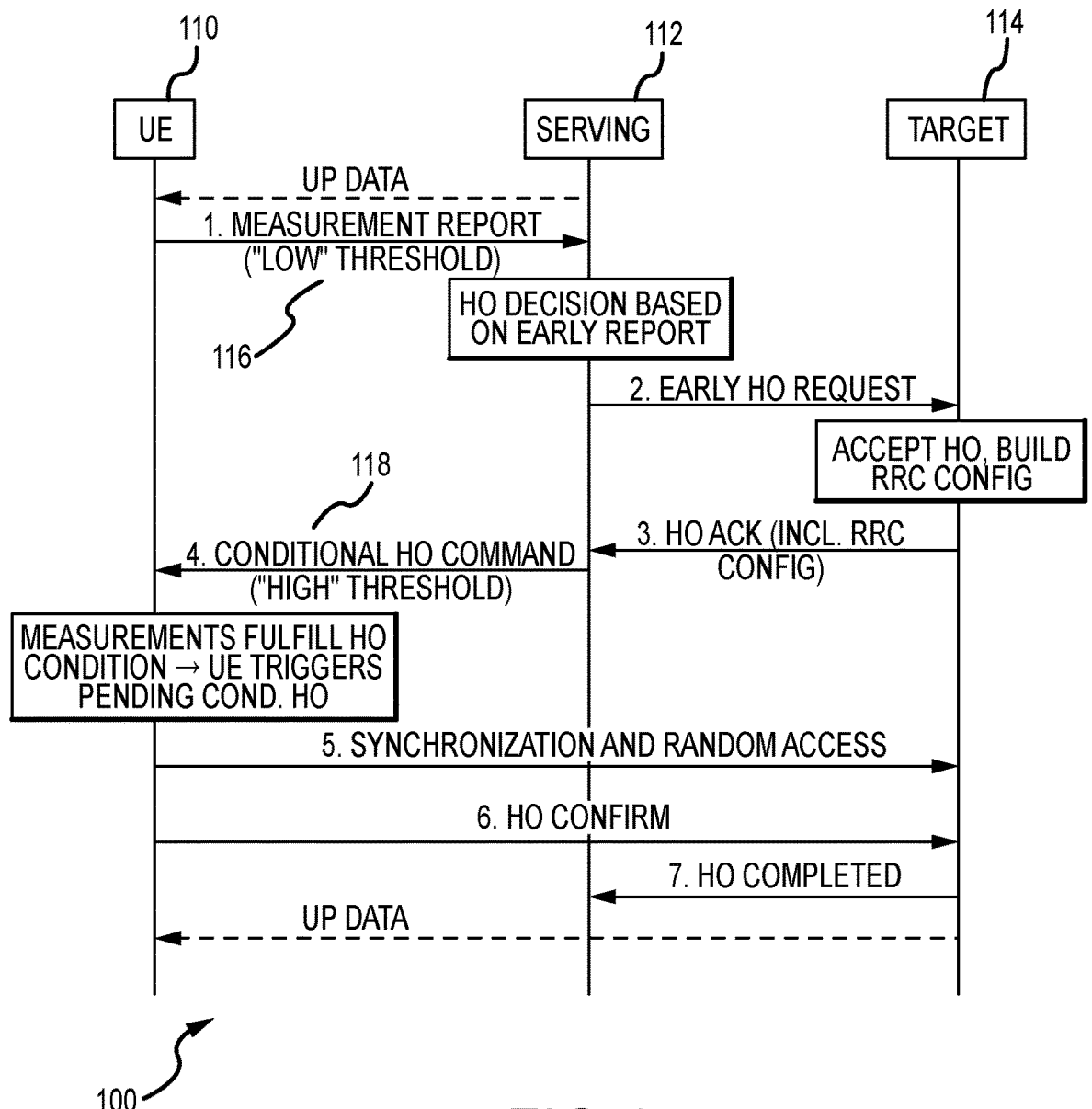
FIG. 1 is a diagram of a signaling flow for conditional handover execution in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of a signaling flow for conditional handover execution in accordance with one or more embodiments will be discussed. In the signaling flow 100 of the conditional handover of FIG. 1, a lower threshold may be used at operation 116 to trigger an earlier measurement report generated by user equipment (UE) 110 in order to increase the reliability of the handover command send by serving cell 112 to UE 110 at operation 118. The handover (HO) command at operation 118 contains a high threshold condition such that when the high threshold condition is met, then the UE 110 will trigger handover, synchronization to target cell 114, and random access to target cell 114.

As discussed herein, a different approach may be made for the conditional handover wherein a second time to trigger (TTT) value may be used during the evaluation of the conditional evaluation of the HO command at operation 118. A constraint may be added to reduce the frequency of measurement reporting at operation 117, and an indication of a selected target cell 114 may be provided when multiple handover commands are sent to the UE 110 at operation 118.

In one or more embodiments, a second TTT value may be configured by the network in the HO command at operation for evaluating the condition which will trigger the UE based handover. Such a second TTT value may be similar to or the same as a first TTT value which would otherwise trigger the handover event. In a first option, the second TTT may be the same as the first TTT such at no additional signaling is needed in the HO command at to indicate the value of the second TTT. In this first option, UE behavior is different as UE 110 will reuse the first TTT value for the first event trigger for the second TTT value. In a second option, a new TTT signal with its own value in may be signaled in the HO command at operation 118 for the UE 110 to evaluate whether or not to execute the conditional handover command.

Behavior of the UE 110 in evaluating the condition of the conditional handover using the second TTT may be as follows. When the UE 110 receives the HO command at operation 118 from the network, for example from serving cell 112, the HO command contains the target cell identifier (ID) and the threshold where used to evaluate the UE based HO condition. In addition, the HO command optionally may contain the second TTT value for the second option, above. If the target cell 114 indicated in the HO command meets the threshold configured by the network, the second TTT may be started. If the target cell 114 indicated in the HO command does not met the threshold configured by the network, the second TTT is stopped. If the second time to trigger timer expires, the UE 110 may trigger the UE based HO where and will initiate the random-access channel (RACH) procedure to access the target cell 114 for the handover.

Considering the increased frequency of measurement reporting resulting from a lower threshold, one of the drawback of a conditional handover command at operation 118 is signaling overhead. Measurement reporting increases due to early event triggering as a result of the lower threshold for the measurement report at operation 116. The measurement reporting signaling overhead may be reduced as follows.

In one embodiment, a timer may be configured by the network to limit the frequency of the measurement reporting. The timer duration indicates that the UE 110 should not send the measurement report again if the time between the previous measurement report and the new triggering time is less than the timer duration. The UE 110 should wait at least the duration before it sends a new measurement report.

In another embodiment, repeated measurement reporting for a given target cell 114 is avoided in the same handover cycle. If the UE 110 has already sent a measurement report triggered by a particular target 114 cell, the UE 110 may not need to trigger a measurement report again for the same target cell 114 if the event triggers again, for example either due to an exit event or another measurement report for another cell. Such an arrangement may be optional feature configured by the network or may be specified in a Third Generation Partnership Project (3GPP) specification.

In an additional embodiment, multiple cells may trigger handover for the same measurement report and will not need to trigger handover again. In case where there are multiple cell triggers for some event, the UE 110 may send the measurement results for multiple cells in the same measurement report. The UE 110 will not need to send the measurement report again for same cell or cells in the same handover cycle.

In a further embodiment, when the cell exits the triggering event, the cell may be considered a new cell again, and the measurement report can be triggered again. In yet a further embodiment, when there are more than N number of cells pending in the conditional handover in the same handover cycle, the UE 110 will not send measurement report within the same handover cycle. In yet another embodiment, the UE may include up to N cells for the measurement report and then wait for time T before it triggers N+1 or more cells. Such an arrangement may occur for groups of every N number cells.

Embodiments directed to the behavior of UE 110 when multiple HO commands are received may be as follows. In one embodiment, the UE 110 only keeps the latest HO command as the final HO command. The UE 110 only keeps HO commands for N number target cell and only evaluates the HO commands for the N number of target cells 114 indicated in the HO command. In some embodiments, N can have any value of one or greater than one.

In a first option for such an embodiment, when the latest HO command arrives, the UE 110 removes all configuration information from the previous HO command wherein the old target cell is removed and replaced by the new target cell list sent by the network. For example, if the first HO command indicates target cell #1, then the second HO command indicate target cell #1 and target cell #2. Now the UE 110 may consider both target cell #1 and target cell #2. A third HO command then indicates target cell #2, target cell #3, and target cell #4. Then the UE 110 only considers target cell #2, target cell #3, and target cell #4.

In a second option for this embodiment, the latest HO command may utilize a delta configuration to only overwrite the value if the value exists in the latest HO command. In a first variant, if a first HO command indicates target cell #1, then the second HO command may indicate target cell #1 and target cell #2. Now the UE 110 considers both target cell #1 and target cell #2. If a third HO command indicates target cell #2, target cell #3, and target cell #4, then the UE 110 only considers target cell #2, target cell #3, and target cell #4. In a second variant, if the first HO command indicates target cell #1, then the second HO command may indicate target cell #1 and target cell #2. Now the UE 110 considers both target cell #1 and target cell #2. If the third HO command indicates target cell #2, target cell #3, and target cell #4, then the UE 110 only considers target cell #1, target cell #2, target cell #3, and target cell #4

In another embodiment, the UE 110 only considers all HO commands within the same HO cycle, that is the UE 110 only keeps all target cells for the evaluation. In a first option of this embodiment, the UE 110 considers all target cells 114 included in all HO commands for the conditional HO. In a second option for this embodiment, the UE 110 only considers last N number of target cells 114 included in all HO commands for the conditional HO. The value of N may be configurable by the network or set forth in the 3GPP specification.

In yet another embodiment, a particular target cell ID in the HO command may be removed. This arrangement allows the network to remove a particular target cell ID and to send the removal information to the UE 110. This indicates to the UE 110 that the network has released the resources for the indicated target cell ID and the resources are no longer reserved for the UE 110.

Figure 2:
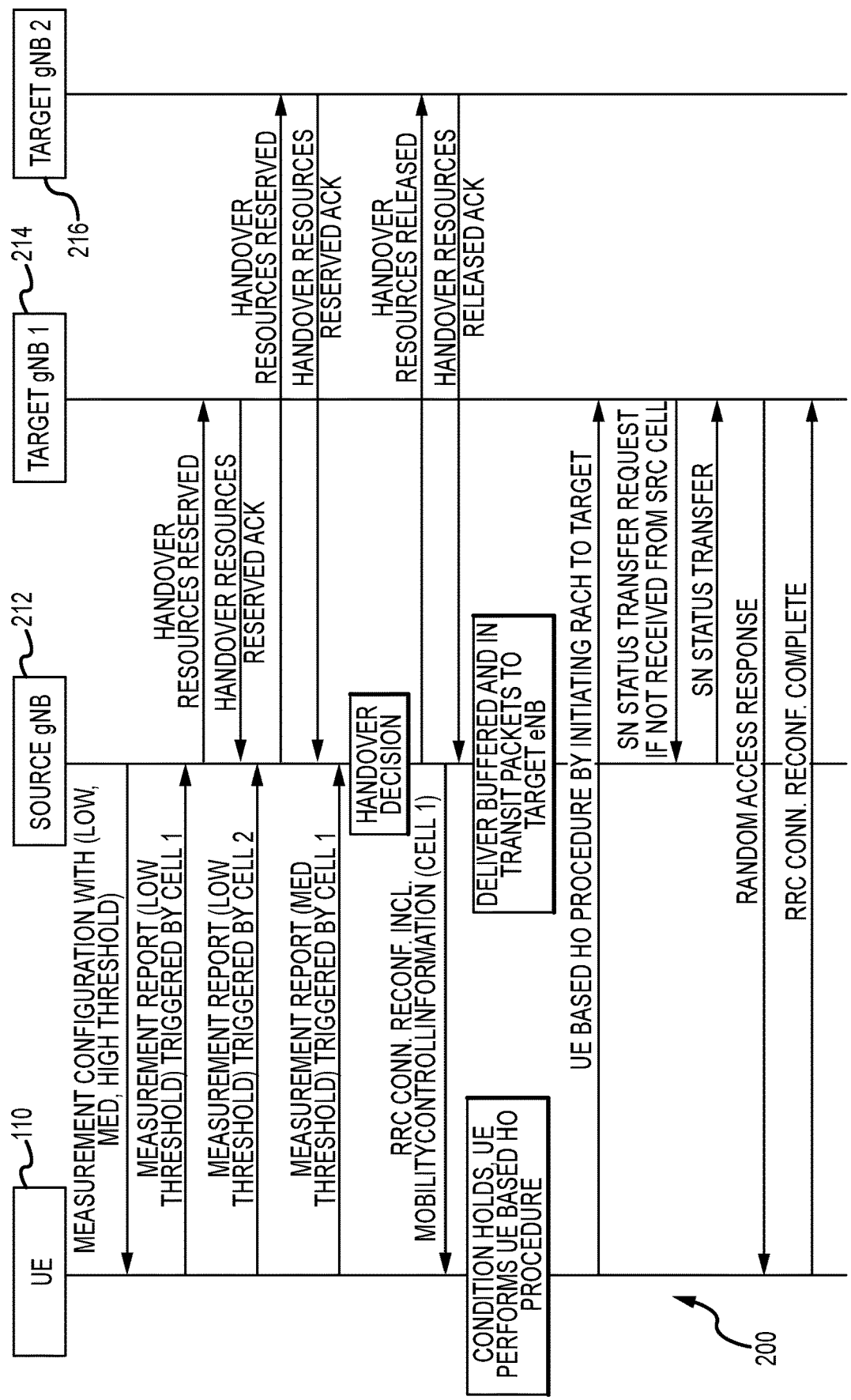
FIG. 2 is a diagram of a signaling flow for enhanced conditional handover in accordance with one or more embodiments.

Referring now to FIG. 2, a a diagram of a signaling flow for enhanced conditional handover in accordance with one or more embodiments will be discussed. As discussed herein above, FIG. 1 shows the signaling flow of a conditional handover process. One drawback of the conditional handover process 100 of FIG. 1 is the large amount of signaling overhead in sending increased measurement reporting due to the configured low threshold, in the multiple HO commands send by the serving cell 112, and the X2 signaling between serving cell 112 and target cell 114. In accordance with one or more embodiments, enhancement of the conditional handover to reduce the signaling overhead may be provided.

Such enhancement may include the measurement event configuring three thresholds for measurement report triggering and UE based handover (HO), signaling to reserve resources from the source cell 112 to the target cell 114, and/or signaling to release resources from the source cell 112 to the target cell 114, or the target cell 114 to the source cell 112.

FIG. 2 illustrates such an enhanced conditional handover process 200 wherein the network may configure multiple thresholds. A low threshold is used to trigger a measurement report sent by the UE 110 to the source Fifth Generation (5G) New Radio (NR) NodeB (gNB) 212 so that source gNB 212 can get handover resources by the target gNB such as target gNB 214 or target gNB 216. A medium threshold is used to a trigger measurement report sent by the UE to the source gNB 212 indicating that the target gNB 214 seems to be getting closer and should trigger a handover. The source gNB 212 then sends the HO command with mobilityControlInfo prepared by the target gNB 214 earlier. The network then can release other resources. When the UE 110 measures the condition met and compares the condition with the high threshold, then the UE 110 triggers the UE based HO.

In a first embodiment, the network configures the measurement configuration with event with three thresholds, low, medium, and high, where the low and high thresholds trigger measurement reports and the high triggers the UE based HO. In a second embodiment, the network sends the HO command to the UE 110 with mobilityControlInfo when receiving a measurement report triggered by the medium threshold.

In a third embodiment, the UE 110 evaluates the high threshold and triggers the UE based HO. In a fourth embodiment, the serving gNB 212 sends handover resources request to a target gNB 214, optionally when receiving a measurement report triggered by the low threshold.

In a fifth embodiment, the target gNB 214 sends a handover resources request acknowledgment (ACK) to the source gNB 212 to indicate the resource is reserved together with mobilityControlInfo for the UE 110. In a sixth embodiment, the target gNB 214 can reject a handover resources request ACK to the source gNB 212. In this case, the source gNB 212 will not consider that cell to be a target.

In a seventh embodiment, the serving gNB 212 sends a handover resources release to the target gNB 214, optionally when receiving a measurement report triggered by the medium threshold. In an eighth embodiment, the target gNB 214 sends a handover resources release ACK to the source gNB 212 to indicate the resource is released.

In a ninth embodiment, the target gNB 214 sends a handover resources release request to the source gNB 212 to request to release the resource. In a tenth embodiment, the source gNB 212 sends a handover resources release ACK to the target gNB 214 to indicate it is okay to release the resources. In an eleventh embodiment, the target gNB 214 indicates a timer to the source gNB 212 where the resources will be valid. When the timer expires, the resource is autonomously released. The source gNB 212 will need to reserve the resource again if it later needs the resource.

Figure 3:
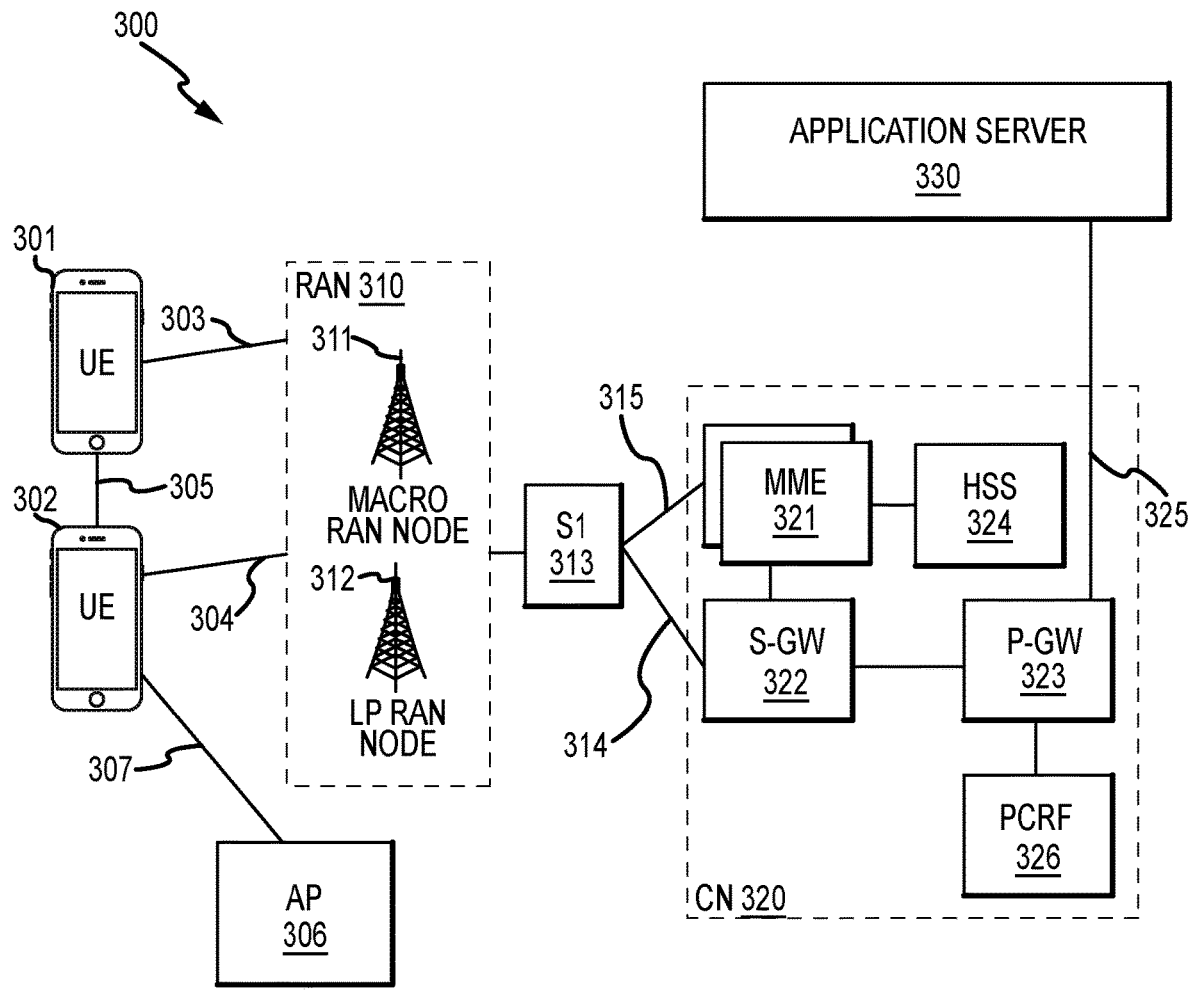
FIG. 3 illustrates an architecture of a system 300 of a network in accordance with some embodiments.

FIG. 3 illustrates an architecture of a system 300 of a network in accordance with some embodiments. The system 300 is shown to include a user equipment (UE) 301 and a UE 302. The UEs 301 and 302 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 301 and 302 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 301 and 302 may be configured to connect, e.g., communicatively couple, with a radio access network (RAN) 310—the RAN 310 may be, for example, an Evolved Universal Mobile Telecommunications System (UMTS) Terrestrial Radio Access Network (E-UTRAN), a NextGen RAN (NG RAN), or some other type of RAN. The UEs 301 and 302 utilize connections 303 and 304, respectively, each of which comprises a physical communications interface or layer (discussed in further detail below); in this example, the connections 303 and 304 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 301 and 302 may further directly exchange communication data via a ProSe interface 305. The ProSe interface 305 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 302 is shown to be configured to access an access point (AP) 306 via connection 307. The connection 307 can comprise a local wireless connection, such as a connection consistent with any IEEE 802.11 protocol, wherein the AP 306 would comprise a wireless fidelity (WiFi®) router. In this example, the AP 306 is shown to be connected to the Internet without connecting to the core network of the wireless system (described in further detail below).

The RAN 310 can include one or more access nodes that enable the connections 303 and 304. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 310 may include one or more RAN nodes for providing macrocells, e.g., macro RAN node 311, and one or more RAN nodes for providing femtocells or picocells (e.g., cells having smaller coverage areas, smaller user capacity, or higher bandwidth compared to macrocells), e.g., low power (LP) RAN node 312.

Any of the RAN nodes 311 and 312 can terminate the air interface protocol and can be the first point of contact for the UEs 301 and 302. In some embodiments, any of the RAN nodes 311 and 312 can fulfill various logical functions for the RAN 310 including, but not limited to, radio network controller (RNC) functions such as radio bearer management, uplink and downlink dynamic radio resource management and data packet scheduling, and mobility management.

In accordance with some embodiments, the UEs 301 and 302 can be configured to communicate using Orthogonal Frequency-Division Multiplexing (OFDM) communication signals with each other or with any of the RAN nodes 311 and 312 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 311 and 312 to the UEs 301 and 302, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 301 and 302. The physical downlink control channel (PDCCH) may carry information about the transport format and resource allocations related to the PDSCH channel, among other things. It may also inform the UEs 301 and 302 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 311 and 312 based on channel quality information fed back from any of the UEs 301 and 302. The downlink resource assignment information may be sent on the PDCCH used for (e.g., assigned to) each of the UEs 301 and 302.

The PDCCH may use control channel elements (CCEs) to convey the control information. Before being mapped to resource elements, the PDCCH complex-valued symbols may first be organized into quadruplets, which may then be permuted using a sub-block interleaver for rate matching.

Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 310 is shown to be communicatively coupled to a core network (CN) 320—via an S1 interface 313. In embodiments, the CN 320 may be an evolved packet core (EPC) network, a NextGen Packet Core (NPC) network, or some other type of CN. In this embodiment the S1 interface 313 is split into two parts: the S1-U interface 314, which carries traffic data between the RAN nodes 311 and 312 and the serving gateway (S-GW) 322, and the S1-mobility management entity (MME) interface 315, which is a signaling interface between the RAN nodes 311 and 312 and MMEs 321.

In this embodiment, the CN 320 comprises the MMEs 321, the S-GW 322, the Packet Data Network (PDN) Gateway (P-GW) 323, and a home subscriber server (HSS) 324. The MMEs 321 may be similar in function to the control plane of legacy Serving General Packet Radio Service (GPRS) Support Nodes (SGSN). The MMEs 321 may manage mobility aspects in access such as gateway selection and tracking area list management. The HSS 324 may comprise a database for network users, including subscription-related information to support the network entities' handling of communication sessions. The CN 320 may comprise one or several HSSs 324, depending on the number of mobile subscribers, on the capacity of the equipment, on the organization of the network, etc. For example, the HSS 324 can provide support for routing/roaming, authentication, authorization, naming/addressing resolution, location dependencies, etc.

The S-GW 322 may terminate the S1 interface 313 towards the RAN 310, and routes data packets between the RAN 310 and the CN 320. In addition, the S-GW 322 may be a local mobility anchor point for inter-RAN node handovers and also may provide an anchor for inter-3GPP mobility. Other responsibilities may include lawful intercept, charging, and some policy enforcement.

The P-GW 323 may terminate an SGi interface toward a PDN. The P-GW 323 may route data packets between the EPC network 323 and external networks such as a network including the application server 330 (alternatively referred to as application function (AF)) via an Internet Protocol (IP) interface 325. Generally, the application server 330 may be an element offering applications that use IP bearer resources with the core network (e.g., UMTS Packet Services (PS) domain, LTE PS data services, etc.). In this embodiment, the P-GW 323 is shown to be communicatively coupled to an application server 330 via an IP communications interface 325. The application server 330 can also be configured to support one or more communication services (e.g., Voice-over-Internet Protocol (VoIP) sessions, PTT sessions, group communication sessions, social networking services, etc.) for the UEs 301 and 302 via the CN 320.

The P-GW 323 may further be a node for policy enforcement and charging data collection. Policy and Charging Enforcement Function (PCRF) 326 is the policy and charging control element of the CN 320. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 326 may be communicatively coupled to the application server 330 via the P-GW 323. The application server 330 may signal the PCRF 326 to indicate a new service flow and select the appropriate Quality of Service (QoS) and charging parameters. The PCRF 326 may provision this rule into a Policy and Charging Enforcement Function (PCEF) (not shown) with the appropriate traffic flow template (TFT) and QoS class of identifier (QCI), which commences the QoS and charging as specified by the application server 330.

Figure 4:
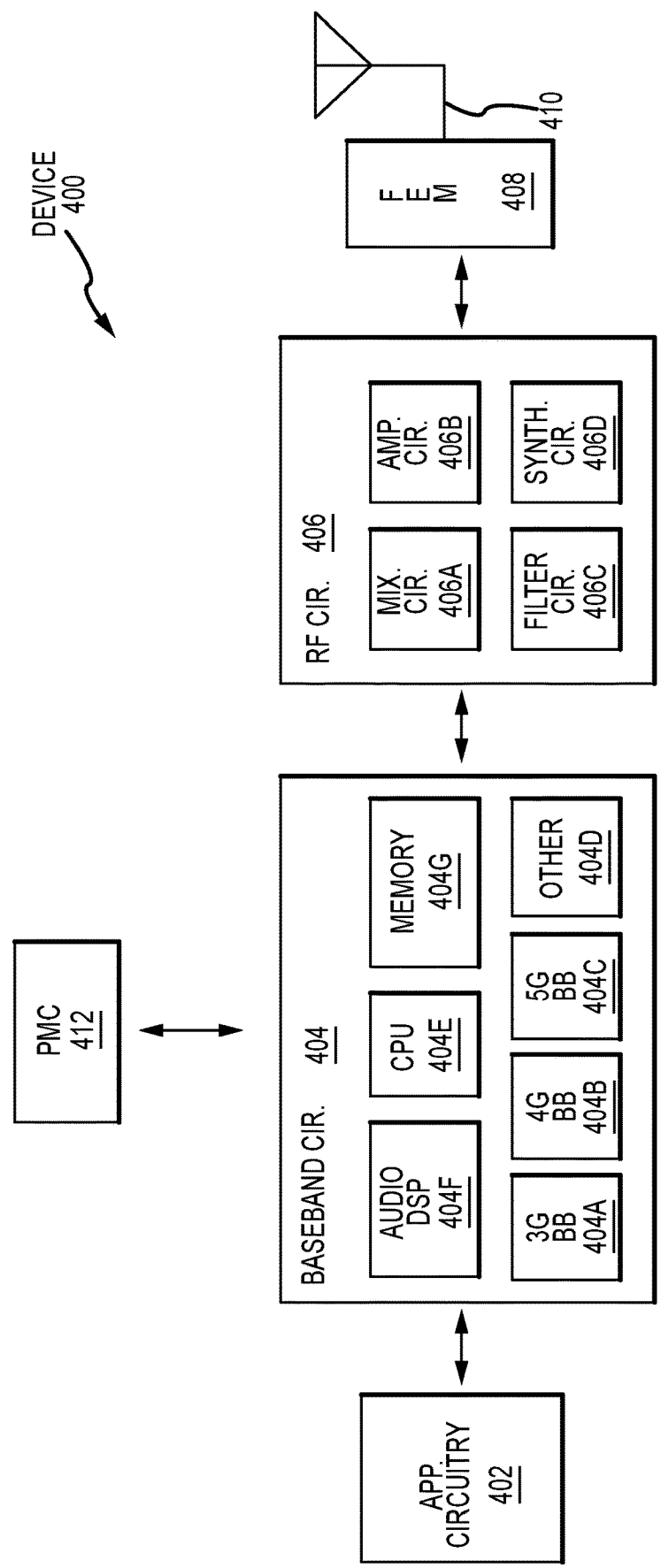
FIG. 4 illustrates example components of a device 400 in accordance with some embodiments.

FIG. 4 illustrates example components of a device 400 in accordance with some embodiments. In some embodiments, the device 400 may include application circuitry 402, baseband circuitry 404, Radio Frequency (RF) circuitry 406, front-end module (FEM) circuitry 408, one or more antennas 410, and power management circuitry (PMC) 412 coupled together at least as shown. The components of the illustrated device 400 may be included in a UE or a RAN node. In some embodiments, the device 400 may include less elements (e.g., a RAN node may not utilize application circuitry 402, and instead include a processor/controller to process IP data received from an EPC). In some embodiments, the device 400 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 400. In some embodiments, processors of application circuitry 402 may process IP data packets received from an EPC.

The baseband circuitry 404 may include circuitry such as, but not limited to, one or more single-core or multi-core processors. The baseband circuitry 404 may include one or more baseband processors or control logic to process baseband signals received from a receive signal path of the RF circuitry 406 and to generate baseband signals for a transmit signal path of the RF circuitry 406. Baseband processing circuitry 404 may interface with the application circuitry 402 for generation and processing of the baseband signals and for controlling operations of the RF circuitry 406. For example, in some embodiments, the baseband circuitry 404 may include a third generation (3G) baseband processor 404A, a fourth generation (4G) baseband processor 404B, a fifth generation (5G) baseband processor 404C, or other baseband processor(s) 404D for other existing generations, generations in development or to be developed in the future (e.g., second generation (2G), sixth generation (6G), etc.). The baseband circuitry 404 (e.g., one or more of baseband processors 404A-D) may handle various radio control functions that enable communication with one or more radio networks via the RF circuitry 406. In other embodiments, some or all of the functionality of baseband processors 404A-D may be included in modules stored in the memory 404G and executed via a Central Processing Unit (CPU) 404E. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, or constellation mapping/demapping functionality. In some embodiments, encoding/decoding circuitry of the baseband circuitry 404 may include convolution, tail-biting convolution, turbo, Viterbi, or Low-Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include one or more audio digital signal processor(s) (DSP) 404F. The audio DSP(s) 404F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 404 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path which may include circuitry to down-convert RF signals received from the FEM circuitry 408 and provide baseband signals to the baseband circuitry 404. RF circuitry 406 may also include a transmit signal path which may include circuitry to up-convert baseband signals provided by the baseband circuitry 404 and provide RF output signals to the FEM circuitry 408 for transmission.

In some embodiments, the receive signal path of the RF circuitry 406 may include mixer circuitry 406a, amplifier circuitry 406*b* and filter circuitry 406*c*. In some embodiments, the transmit signal path of the RF circuitry 406 may include filter circuitry 406*c* and mixer circuitry 406*a*. RF circuitry 406 may also include synthesizer circuitry 406*d* for synthesizing a frequency for use by the mixer circuitry 406*a* of the receive signal path and the transmit signal path. In some embodiments, the mixer circuitry 406*a* of the receive signal path may be configured to down-convert RF signals received from the FEM circuitry 408 based on the synthesized frequency provided by synthesizer circuitry 406*d*. The amplifier circuitry 406*b* may be configured to amplify the down-converted signals and the filter circuitry 406*c* may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, mixer circuitry 406*a* of the receive signal path may comprise passive mixers, although the scope of the embodiments is not limited in this respect.

In some embodiments, the mixer circuitry 406*a* of the transmit signal path may be configured to up-convert input baseband signals based on the synthesized frequency provided by the synthesizer circuitry 406*d* to generate RF output signals for the FEM circuitry 408. The baseband signals may be provided by the baseband circuitry 404 and may be filtered by filter circuitry 406*c*.

In some embodiments, the mixer circuitry 406*a* of the receive signal path and the mixer circuitry 406*a* of the transmit signal path may include two or more mixers and may be arranged for quadrature downconversion and upconversion, respectively. In some embodiments, the mixer circuitry 406*a* of the receive signal path and the mixer circuitry 406*a* of the transmit signal path may include two or more mixers and may be arranged for image rejection (e.g., Hartley image rejection). In some embodiments, the mixer circuitry 406*a* of the receive signal path and the mixer circuitry 406*a* may be arranged for direct downconversion and direct upconversion, respectively. In some embodiments, the mixer circuitry 406*a* of the receive signal path and the mixer circuitry 406*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 404 may include a digital baseband interface to communicate with the RF circuitry 406.

In some dual-mode embodiments, a separate radio IC circuitry may be provided for processing signals for each spectrum, although the scope of the embodiments is not limited in this respect. In some embodiments, the synthesizer circuitry 406*d* may be a fractional-N synthesizer or a fractional N/N+1 synthesizer, although the scope of the embodiments is not limited in this respect as other types of frequency synthesizers may be suitable. For example, synthesizer circuitry 406*d* may be a delta-sigma synthesizer, a frequency multiplier, or a synthesizer comprising a phase-locked loop with a frequency divider.

The synthesizer circuitry 406*d* may be configured to synthesize an output frequency for use by the mixer circuitry 406*a* of the RF circuitry 406 based on a frequency input and a divider control input. In some embodiments, the synthesizer circuitry 406*d* may be a fractional N/N+1 synthesizer.

In some embodiments, frequency input may be provided by a voltage-controlled oscillator (VCO), although that is not a requirement. Divider control input may be provided by either the baseband circuitry 404 or the applications processor 402 depending on the desired output frequency. In some embodiments, a divider control input (e.g., N) may be determined from a look-up table based on a channel indicated by the applications processor 402.

Synthesizer circuitry 406*d* of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 406*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 406 may include an IQ/polar converter.

FEM circuitry 408 may include a receive signal path which may include circuitry configured to operate on RF signals received from one or more antennas 410, amplify the received signals and provide the amplified versions of the received signals to the RF circuitry 406 for further processing. FEM circuitry 408 may also include a transmit signal path which may include circuitry configured to amplify signals for transmission provided by the RF circuitry 406 for transmission by one or more of the one or more antennas 410. In various embodiments, the amplification through the transmit or receive signal paths may be done solely in the RF circuitry 406, solely in the FEM 408, or in both the RF circuitry 406 and the FEM 408.

In some embodiments, the FEM circuitry 408 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 406). The transmit signal path of the FEM circuitry 408 may include a power amplifier (PA) to amplify input RF signals (e.g., provided by RF circuitry 406), and one or more filters to generate RF signals for subsequent transmission (e.g., by one or more of the one or more antennas 410).

In some embodiments, the PMC 412 may manage power provided to the baseband circuitry 404. In particular, the PMC 412 may control power-source selection, voltage scaling, battery charging, or DC-to-DC conversion. The PMC 412 may often be included when the device 400 is capable of being powered by a battery, for example, when the device is included in a UE. The PMC 412 may increase the power conversion efficiency while providing desirable implementation size and heat dissipation characteristics.

While FIG. 4 shows the PMC 412 coupled only with the baseband circuitry 404. However, in other embodiments, the PMC 4 12 may be additionally or alternatively coupled with, and perform similar power management operations for, other components such as, but not limited to, application circuitry 402, RF circuitry 406, or FEM 408.

In some embodiments, the PMC 412 may control, or otherwise be part of, various power saving mechanisms of the device 400. For example, if the device 400 is in an RRC_Connected state, where it is still connected to the RAN node as it expects to receive traffic shortly, then it may enter a state known as Discontinuous Reception Mode (DRX) after a period of inactivity. During this state, the device 400 may power down for brief intervals of time and thus save power.

If there is no data traffic activity for an extended period of time, then the device 400 may transition off to an RRC_Idle state, where it disconnects from the network and does not perform operations such as channel quality feedback, handover, etc. The device 400 goes into a very low power state and it performs paging where again it periodically wakes up to listen to the network and then powers down again. The device 400 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 402 and processors of the baseband circuitry 404 may be used to execute elements of one or more instances of a protocol stack. For example, processors of the baseband circuitry 404, alone or in combination, may be used execute Layer 3, Layer 2, or Layer 1 functionality, while processors of the application circuitry 404 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 5:
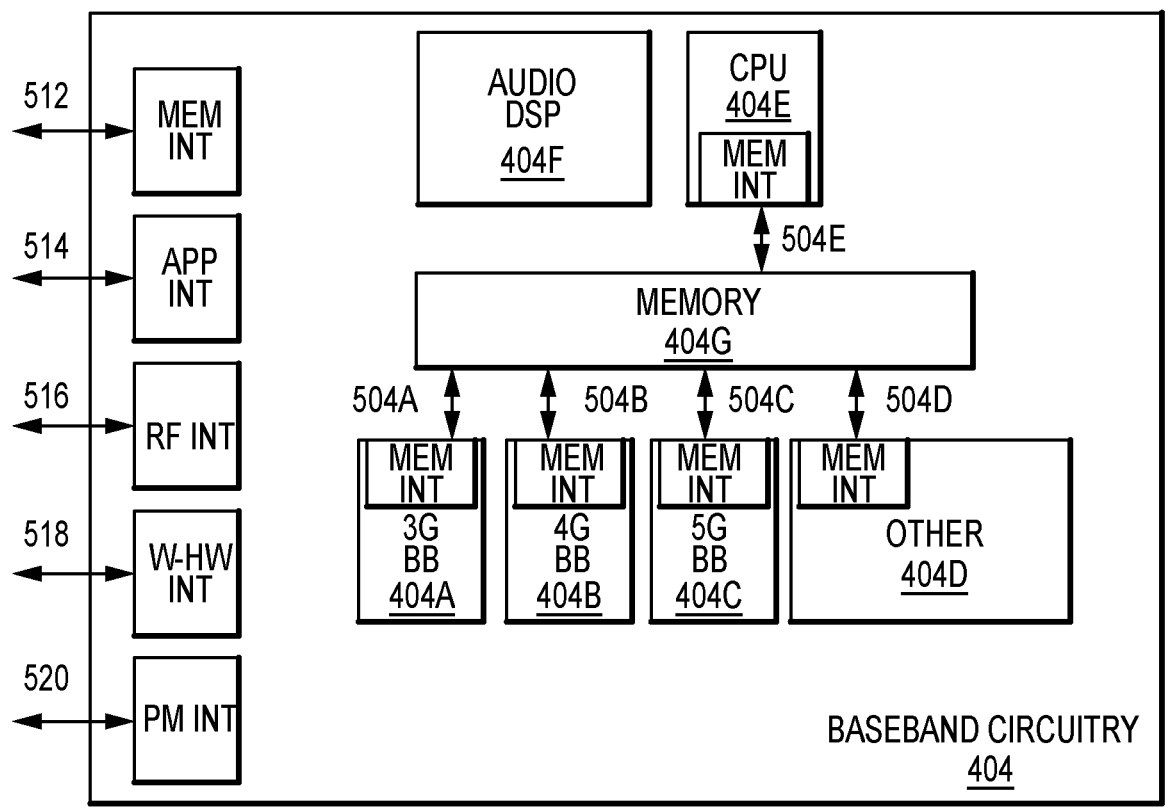
FIG. 5 illustrates example interfaces of baseband circuitry in accordance with some embodiments.

FIG. 5 illustrates example interfaces of baseband circuitry in accordance with some embodiments. As discussed above, the baseband circuitry 404 of FIG. 4 may comprise processors 404A-404E and a memory 404G utilized by said processors. Each of the processors 404A-404E may include a memory interface, 504A-504E, respectively, to send/receive data to/from the memory 404G.

The baseband circuitry 404 may further include one or more interfaces to communicatively couple to other circuitries/devices, such as a memory interface 512 (e.g., an interface to send/receive data to/from memory external to the baseband circuitry 404), an application circuitry interface 514 (e.g., an interface to send/receive data to/from the application circuitry 402 of FIG. 4), an RF circuitry interface 516 (e.g., an interface to send/receive data to/from RF circuitry 406 of FIG. 4), a wireless hardware connectivity interface 518 (e.g., an interface to send/receive data to/from Near Field Communication (NFC) components, Bluetooth® components (e.g., Bluetooth® Low Energy), Wi-Fi® components, and other communication components), and a power management interface 520 (e.g., an interface to send/receive power or control signals to/from the PMC 412.

The following are example implementations of the subject matter described herein. It should be noted that any of the examples and the variations thereof described herein may be used in any permutation or combination of any other one or more examples or variations, although the scope of the claimed subject matter is not limited in these respects.

In example one, an apparatus of a user equipment (UE) comprises one or more baseband processors to decode a conditional handover command from a serving cell for the UE to connect with a target cell, and to evaluate a condition before executing the handover command, wherein a first time to trigger (TTT) is started in the event the condition is true, and wherein a second TTT is started in the event the condition is true at an expiration of the first TTT, and wherein the one or more baseband processors are to execute the conditional handover command when the condition is true after an expiration of the second TTT, and a memory to store the first TTT and the second TTT. Example two may include the subject matter of example one or any of the examples described herein, wherein a value of the second TTT equal to a value of the first TTT. Example three may include the subject matter of example one or any of the examples described herein, wherein a value of the second TTT is indicated in the conditional handover command. Example four may include the subject matter of example one or any of the examples described herein, wherein the conditional handover command incudes a target cell identifier (ID), a value of a threshold for the condition, and a value of the second TTT. Example five may include the subject matter of example one or any of the examples described herein, wherein the second TTT is not started, or is stopped, when the condition is not true after an expiration of the first TTT. Example six may include the subject matter of example one or any of the examples described herein, wherein the one or more baseband processors are to initiate a random-access channel (RACH) procedure to access the target cell in the event the condition is true after the second TTT. Example seven may include the subject matter of example one or any of the examples described herein, wherein the one or more baseband processors are configured to wait until an expiration of a timer before encoding a subsequent measurement report to be sent to the serving cell. Example eight may include the subject matter of example one or any of the examples described herein, wherein the one or more baseband processors are configured to prevent encoding a subsequent measurement report for the target cell in a single handover cycle. Example nine may include the subject matter of example one or any of the examples described herein, wherein the one or more baseband processors are to encode multiple condition triggering events in a single measurement report, and to prevent encoding a subsequent measurement report for the target cell in a single handover cycle. Example ten may include the subject matter of example one or any of the examples described herein, wherein the one or more baseband processors are to encode a subsequent measurement report after an exit event from the serving cell. Example eleven may include the subject matter of example one or any of the examples described herein, wherein the one or more baseband processors are to prevent encoding a measurement report for a number of cells greater than N when N number of cells are pending in a single handover cycle. Example twelve may include the subject matter of example one or any of the examples described herein, wherein the one or more baseband processors are to encode the measurement report for up to N number of cells, and to wait for a predetermined time to encode a subsequent measurement report for up to a next N number of cells. Example thirteen may include the subject matter of example one or any of the examples described herein, wherein the one or more baseband processors are to evaluate a latest handover command for N number of cells in the latest handover command, or to evaluate only one or more handover commands received during a present handover cycle. Example fourteen may include the subject matter of example one or any of the examples described herein, wherein the one or more baseband processors are to remove from evaluation one or more target cells identified in the handover command.

In example fifteen, an apparatus of a user equipment (UE) comprises one or more baseband processors to decode a measurement configuration message received from a serving cell, wherein the measurement configuration message indicates a low threshold, a medium threshold, and a high threshold, wherein the low threshold is the trigger a measurement report, the medium threshold is to trigger a measurement report and to indicate that a target cell is close to triggering a handover, and the high threshold is to trigger a handover, and a memory to store the low threshold, the medium threshold, and the high threshold. Example sixteen may include the subject matter of example fifteen or any of the examples described herein, wherein the one or more baseband processors are to decode mobility control information mobilityControlInfo from a handover command received in response to a measurement report sent to the serving cell when the measurement report is triggered by the medium threshold. Example seventeen may include the subject matter of example fifteen or any of the examples described herein, wherein the one or more baseband processors are to execute a handover command based at least in part on whether the high threshold is met. Example eighteen may include the subject matter of example fifteen or any of the examples described herein, wherein the one or more baseband processors are to generate a measurement report to be sent to a serving cell when the low threshold is met to cause the serving cell to send a handover resources request message to a target cell. Example nineteen may include the subject matter of example fifteen or any of the examples described herein, wherein the one or more baseband processors are to generate a measurement report to be sent to a serving cell when the medium threshold is met to cause the serving cell to send a handover resources release message to a target cell. Example twenty may include the subject matter of example fifteen or any of the examples described herein, wherein the resources are released upon expiration of a timer.

In example twenty-one, one or more machine readable media may have instructions stored thereon that, when executed by an apparatus of a user equipment (UE), result in decoding a conditional handover command from a serving cell for the UE to connect with a target cell, and evaluating a condition before executing the handover command, wherein a first time to trigger (TTT) is started in the event the condition is true, and wherein a second TTT is started in the event the condition is true at an expiration of the first TTT, and wherein the instructions, when executed, result in executing the conditional handover command when the condition is true after an expiration of the second TTT. Example twenty-two may include the subject matter of example twenty-one or any of the examples described herein, wherein a value of the second TTT equal to a value of the first TTT. Example twenty-three may include the subject matter of example twenty-one or any of the examples described herein, wherein a value of the second TTT is indicated in the conditional handover command. Example twenty-four may include the subject matter of example twenty-one or any of the examples described herein, wherein the conditional handover command incudes a target cell identifier (ID), a value of a threshold for the condition, and a value of the second TTT. Example twenty-five may include the subject matter of example twenty-one or any of the examples described herein, wherein the second TTT is not started, or is stopped, when the condition is not true after an expiration of the first TTT.

In example twenty-six, one or more machine readable media may have instructions stored thereon that, when executed by an apparatus of a user equipment (UE), result in decoding a measurement configuration message received from a serving cell, wherein the measurement configuration message indicates a low threshold, a medium threshold, and a high threshold, wherein the low threshold is the trigger a measurement report, the medium threshold is to trigger a measurement report and to indicate that a target cell is close to triggering a handover, and the high threshold is to trigger a handover, evaluating the low threshold or the medium threshold to trigger generating the measurement report, and evaluating the high threshold to trigger the handover. Example twenty-seven may include the subject matter of example twenty-six or any of the examples described herein, wherein the instructions, when executed, further result in decoding mobility control information mobilityControlInfo from a handover command received in response to a measurement report sent to the serving cell when the measurement report is triggered by the medium threshold. Example twenty-eight may include the subject matter of example twenty-six or any of the examples described herein, wherein the instructions, when executed, further result in generating a measurement report to be sent to a serving cell when the low threshold is met to cause the serving cell to send a handover resources request message to a target cell. Example twenty-nine may include the subject matter of example twenty-six or any of the examples described herein, wherein the instructions, when executed, further result in generating a measurement report to be sent to a serving cell when the medium threshold is met to cause the serving cell to send a handover resources release message to a target cell. Example thirty may include the subject matter of example twenty-six or any of the examples described herein, wherein the resources are released upon expiration of a timer.

In example thirty-one, an apparatus of a user equipment (UE) comprises means for decoding a conditional handover command from a serving cell for the UE to connect with a target cell, and means for evaluating a condition before executing the handover command, wherein a first time to trigger (TTT) is started in the event the condition is true, and wherein a second TTT is started in the event the condition is true at an expiration of the first TTT, and wherein the instructions, when executed, result in executing the conditional handover command when the condition is true after an expiration of the second TTT. Example thirty-two may include the subject matter of example thirty-one or any of the examples described herein, wherein a value of the second TTT equal to a value of the first TTT. Example thirty-three may include the subject matter of example thirty-one or any of the examples described herein, wherein a value of the second TTT is indicated in the conditional handover command. Example thirty-four may include the subject matter of example thirty-one or any of the examples described herein, wherein the conditional handover command incudes a target cell identifier (ID), a value of a threshold for the condition, and a value of the second TTT. Example thirty-five may include the subject matter of example thirty-one or any of the examples described herein, wherein the second TTT is not started, or is stopped, when the condition is not true after an expiration of the first TTT.

In example thirty-six, an apparatus of a user equipment (UE) comprises means for decoding a measurement configuration message received from a serving cell, wherein the measurement configuration message indicates a low threshold, a medium threshold, and a high threshold, wherein the low threshold is the trigger a measurement report, the medium threshold is to trigger a measurement report and to indicate that a target cell is close to triggering a handover, and the high threshold is to trigger a handover, means for evaluating the low threshold or the medium threshold to trigger generating the measurement report, and means for evaluating the high threshold to trigger the handover. Example thirty-seven may include the subject matter of example thirty-six or any of the examples described herein, further comprising means for decoding mobility control information mobilityControlInfo from a handover command received in response to a measurement report sent to the serving cell when the measurement report is triggered by the medium threshold. Example thirty-eight may include the subject matter of example thirty-six or any of the examples described herein, further comprising means for executing a handover command based at least in part on whether the high threshold is met. Example thirty-nine may include the subject matter of example thirty-six or any of the examples described herein, further comprising means for generating a measurement report to be sent to a serving cell when the low threshold is met to cause the serving cell to send a handover resources request message to a target cell Example forty may include the subject matter of example thirty-six or any of the examples described herein, further comprising means for generating a measurement report to be sent to a serving cell when the medium threshold is met to cause the serving cell to send a handover resources release message to a target cell. Example forty-one may include the subject matter of example thirty-six or any of the examples described herein, wherein the resources are released upon expiration of a timer. In example forty-two, machine-readable storage may include machine-readable instructions, when executed, to realize an apparatus as claimed in any preceding claim.

Although the claimed subject matter has been described with a certain degree of particularity, it should be recognized that elements thereof may be altered by persons skilled in the art without departing from the spirit and/or scope of claimed subject matter. It is believed that the subject matter pertaining to enhanced conditional handover and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a user equipment (UE), comprising:
one or more baseband processors to decode a conditional handover command from a serving cell for the UE to connect with a target cell, and to evaluate a condition before executing the handover command, wherein a first time to trigger (TTT) is started in the event the condition is true, and wherein a second TTT is started in the event the condition is true at an expiration of the first TTT, and wherein the one or more baseband processors are to execute the conditional handover command when the condition is true after an expiration of the second TTT; and
a memory to store the first TTT and the second TTT.

2. The apparatus of claim 1, wherein a value of the second TTT equal to a value of the first TTT.

3. The apparatus of claim 1, wherein a value of the second TTT is indicated in the conditional handover command.

4. The apparatus of claim 1, wherein the conditional handover command includes a target cell identifier (ID), a value of a threshold for the condition, and a value of the second TTT.

5. The apparatus of claim 1, wherein the second TTT is not started, or is stopped, when the condition is not true after an expiration of the first TTT.

6. The apparatus of claim 1, wherein the one or more baseband processors are to initiate a random-access channel (RACH) procedure to access the target cell in the event the condition is true after the second TTT.

7. The apparatus of claim 1, wherein the one or more baseband processors are configured to wait until an expiration of a timer before encoding a subsequent measurement report to be sent to the serving cell.

8. The apparatus of claim 1, wherein the one or more baseband processors are configured to prevent encoding a subsequent measurement report for the target cell in a single handover cycle.

9. The apparatus of claim 1, wherein the one or more baseband processors are to encode multiple condition triggering events in a single measurement report, and to prevent encoding a subsequent measurement report for the target cell in a single handover cycle.

10. The apparatus of claim 1, wherein the one or more baseband processors are to encode a subsequent measurement report after an exit event from the serving cell.

11. An apparatus of a user equipment (UE), comprising:
one or more baseband processors to decode a measurement configuration message received from a serving cell, wherein the measurement configuration message indicates a low threshold, a medium threshold, and a high threshold, wherein the low threshold is the trigger a measurement report, the medium threshold is to trigger a measurement report and to indicate that a target cell is close to triggering a handover, and the high threshold is to trigger a handover; and
a memory to store the low threshold, the medium threshold, and the high threshold.

12. The apparatus of claim 1, wherein the one or more baseband processors are to decode mobility control information mobilityControlInfo from a handover command received in response to a measurement report sent to the serving cell when the measurement report is triggered by the medium threshold.

13. The apparatus of claim 11, wherein the one or more baseband processors are to execute a handover command based at least in part on whether the high threshold is met.

14. The apparatus of claim 11, wherein the one or more baseband processors are to generate a measurement report to be sent to a serving cell when the low threshold is met to cause the serving cell to send a handover resources request message to a target cell.

15. The apparatus of claim 11, wherein the one or more baseband processors are to generate a measurement report to be sent to a serving cell when the medium threshold is met to cause the serving cell to send a handover resources release message to a target cell.

16. One or more non-transitory machine readable media having instructions stored thereon that, when executed by an apparatus of a user equipment (UE), result in:
  decoding a conditional handover command from a serving cell for the UE to connect with a target cell; and
  evaluating a condition before executing the handover command, wherein a first time to trigger (TTT) is started in the event the condition is true, and wherein a second TTT is started in the event the condition is true at an expiration of the first TTT, and wherein the instructions, when executed, result in executing the conditional handover command when the condition is true after an expiration of the second TTT.

17. The one or more non-transitory machine readable media of claim 16, wherein a value of the second TTT equal to a value of the first TTT.

18. The one or more machine readable media of claim 16, wherein a value of the second TTT is indicated in the conditional handover command.

19. The one or more non-transitory machine readable media of claim 16, wherein the conditional handover command includes a target cell identifier (ID), a value of a threshold for the condition, and a value of the second TTT.

20. The one or more machine non-transitory readable media of claim 16, wherein the second TTT is not started, or is stopped, when the condition is not true after an expiration of the first TTT.

* * * * *

UNITED STATES PATENT AND TRADEMARK OFFICE
CERTIFICATE OF CORRECTION

PATENT NO. : 10,986,548 B2  
APPLICATION NO. : 16/488175  
DATED : April 20, 2021  
INVENTOR(S) : Yiu Page 1 of 1

It is certified that error appears in the above-identified patent and that said Letters Patent is hereby corrected as shown below:

In the Claims

Claim 11, Column 18, Lines 55:
"high threshold, wherein the low threshold is the trigger" should read "high threshold, wherein the low threshold is to trigger"

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*